United States Patent
Grunick et al.

(10) Patent No.: US 9,785,676 B2
(45) Date of Patent: Oct. 10, 2017

(54) SYSTEMS AND METHODS FOR PROVIDING ORDERED RESULTS FOR SEARCH QUERIES

(71) Applicant: MapQuest, Inc., Denver, CO (US)

(72) Inventors: Miria Grunick, New York, NY (US); Antony Pegg, East Petersburg, PA (US); Sanjay Manseta, Lancaster, PA (US)

(73) Assignee: Mapquest, Inc., Denver, CO (US)

( * ) Notice: Subject to any disclaimer, the term of this patent is extended or adjusted under 35 U.S.C. 154(b) by 332 days.

(21) Appl. No.: 13/954,406

(22) Filed: Jul. 30, 2013

(65) Prior Publication Data

US 2015/0039602 A1   Feb. 5, 2015

(51) Int. Cl.
*G06F 17/30* (2006.01)
*G06Q 30/02* (2012.01)
*G06F 7/06* (2006.01)
*G06F 15/18* (2006.01)

(52) U.S. Cl.
CPC ...... *G06F 17/3053* (2013.01); *G06F 17/3069* (2013.01); *G06F 17/30637* (2013.01)

(58) Field of Classification Search
CPC ............. G06F 17/30864; G06F 17/30867
USPC .............................................. 707/728
See application file for complete search history.

(56) References Cited

U.S. PATENT DOCUMENTS

| | | | |
|---|---|---|---|
| 6,094,648 A | 7/2000 | Aalbersberg | |
| 8,370,347 B1 * | 2/2013 | Zhang | G06F 17/30687 707/728 |
| 8,762,326 B1 * | 6/2014 | Zhou | G06F 17/30864 707/609 |
| 8,825,644 B1 * | 9/2014 | Crichton | G06F 17/30867 707/732 |
| 2005/0114133 A1 * | 5/2005 | Mark | G06Q 10/06 704/251 |
| 2009/0006356 A1 * | 1/2009 | Liao | G06F 17/30867 |
| 2009/0144262 A1 | 6/2009 | White et al. | |
| 2009/0187554 A1 | 7/2009 | Dugan et al. | |

(Continued)

OTHER PUBLICATIONS

Matthew Peters, "Determining Relevance: How Similarity is Scored", Jun. 12, 2013, Moz, Inc, p. 2 <https://moz.com/blog/determining-relevance-how-similarity-is-scored>.*

(Continued)

*Primary Examiner* — Hosain Alam
*Assistant Examiner* — Robert F May

(57) ABSTRACT

Systems and methods are provided for providing an ordered list of search results in response to a query. Consistent with certain embodiments, computer-implemented systems and methods may identify content items corresponding to a query. First relevance scores may be determined for the identified content items based on their relevance to the query. Second relevance scores may be determined by modifying at least one of the first relevance scores using a boost value. The boost value may be set to a default boost value when the query does not include an override boost value. The boost value may be set to the override boost value, when the query includes an override boost value. An ordered list of the identified content items may be generated based on the second relevance scores. The ordered list may be displayed on a display device.

21 Claims, 5 Drawing Sheets

(56) References Cited

U.S. PATENT DOCUMENTS

| | | | | |
|---|---|---|---|---|
| 2011/0022549 A1* | 1/2011 | Zhuang | ............ | G06F 17/30696 706/12 |
| 2013/0198174 A1* | 8/2013 | Poznanski | ......... | G06F 17/30867 707/723 |
| 2014/0297630 A1* | 10/2014 | Cao | ................... | G06F 17/30864 707/725 |
| 2015/0169755 A1* | 6/2015 | Cierniak | ........... | G06F 17/30864 707/706 |

OTHER PUBLICATIONS

International Search Report and Written Opinion mailed Oct. 20, 2014 for International Application No. PCT/US2014/046104 (9 pages).

* cited by examiner http://abc.def.com/search?rspf=xml&searchtype=CODE&sortby=relevance&domain=www.searchengine.com&q=restaurant&lat=39.7503008&lng=-104.997200&restaurantPrice=lowprice

FIG. 3 http://abc.def.com/search?rspf=xml&searchtype=CODE&sortby=relevance&domain=www.searchengine.com&q=restaurant&lat=39.7503 00&lng=-104.997200&restaurantPrice=lowprice&ratingsBoost=2.0

FIG. 5

SYSTEMS AND METHODS FOR PROVIDING ORDERED RESULTS FOR SEARCH QUERIES

TECHNICAL FIELD

The present disclosure relates generally to the field of electronic communications, computerized data processing, and search technologies. More particularly, and without limitation, the present disclosure relates to systems and methods for providing an ordered list of content items to a user in response to, for example, a search query.

BACKGROUND

The Internet has experienced explosive growth and use in recent years. In particular, with the advent of smartphones, tablets, and personal digital assistants (PDAs), users have become accustomed to searching the Internet for a variety of information on a regular basis and from any location. Such information may include textual content, still images, audio content, and/or video content. Moreover, users demand that the most relevant search results be presented to them upfront, making it easier for them to find the desired information without having to review the entire set of search results.

A variety of search engines are available to assist users in finding information. For example, Google™, Bing™, Yahoo™, and many other web sites allow users to conduct web searches. Many of these search engines make their software application program interface (API) available to application and software developers, who may develop applications, which allow the users to perform customized searches. For example, search applications may allow users to search specific categories of items, for example, news, sports, products, jobs, events, entertainment, legal information, medical information, geographic or map information, recipes, people, friends, real estate, and much more.

Search engines typically rank the search results obtained in response to a query, displaying the most relevant search results at the top of an ordered list of results with less relevant items being relegated to the bottom of the list. For example, a search for restaurants near a user's present location, using a search engine, may yield a list of restaurants arranged based on the distance of each restaurant from the user's location. Alternatively, the search engine may display chain restaurants near the user's location at the top of the list and relegate individually owned restaurants to the bottom of the list.

An application developer of a restaurant finder application may, however, wish to present the search results to a user in a different order. For example, in addition to accounting for distance, the application developer may want to preferentially display restaurants which have been rated by other patrons nearer the top of the list of search results as compared to restaurants which have not received a rating. Alternatively, the application developer may want to display restaurants, which provide the price of each item on their menu on their websites, nearer the top of the list as opposed to those restaurants which do not. Although application developers may have access to the search engine API, conventionally they may not have the ability to change the ranking of the search results provided by the search engine.

In view of the above deficiencies, there is a need for improved systems and methods for generating a customized list of search results to present the most relevant information to a user. There is also a need for improved systems and methods for customizing the order in which content items may be displayed to users by increasing or decreasing the importance of certain characteristics of the content items included in the search results.

SUMMARY

In accordance with the present disclosure, systems and methods are provided for ranking search results to provide the most relevant information to a user. In accordance with certain embodiments, a query time boosting algorithm is provided for ranking each content item in the search results. As disclosed herein, embodiments of the present disclosure may allow an application developer to provide boost values to modify a relevance score for each content item in the search results. Embodiments of the present disclosure may also allow the application developer to arrange the content items in an ordered list based on the modified relevance scores before presenting the ordered list to the user. Still further embodiments provide a robust method for application developers to customize their search applications to provide relevant information to users.

In accordance with one exemplary embodiment, a computer-implemented method is provided for providing ordered results for search queries. By way of example, the method comprises searching, using at least one processor, a content database to identify content items corresponding to a query; generating first relevance scores for the identified content items; generating second relevance scores by modifying at least one of the first relevance scores using a boost value; generating, using the at least one processor, an ordered list of the identified content items based on the second relevance scores; and displaying the ordered list on a display device.

In accordance with another exemplary embodiment, a computer-implemented system is provided for ranking search results. By way of example, the system includes a client and a server. The client performs a method including receiving a query; transmitting the query to a server; receiving an ordered list of identified content items from the server; and displaying the ordered list on a display. The server performs a method including searching a content database to identify content items corresponding to the query; determining whether the query includes an override boost value; generating relevance scores for the identified content items using a boost value, wherein the boost value is selected as the override boost value, when the query includes the override boost value and the default boost value, when the query does not include the override boost value; generating an ordered list of the identified content items based on the relevance scores; and transmitting the ordered list to the client.

In accordance with another exemplary embodiment, a computer program product is provided. By way of example, the computer program product includes a set of instructions tangibly embodied in a non-transitory computer-readable medium, the set of instructions being executable by at least one processor to perform a method of providing search results. The method may include searching a content database to identify content items corresponding to a query; generating first relevance scores for the identified content items based on the query; generating second relevance scores by modifying at least one of the first relevance scores using a boost value; generating an ordered list of the identified content items based on the relevance scores; and displaying the ordered list on a display device.

Additional objects and advantages of the embodiments of the present invention will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this present disclosure, illustrate several embodiments of the present disclosure and, together with the description, serve to explain the principles of the present disclosure. In the drawings:

FIG. 3 shows an exemplary query corresponding to which search results may be obtained, consistent with an embodiment of the present disclosure;

FIG. 5 shows an exemplary query including boost values, consistent with an embodiment of the present disclosure.

DETAILED DESCRIPTION OF THE EMBODIMENTS

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
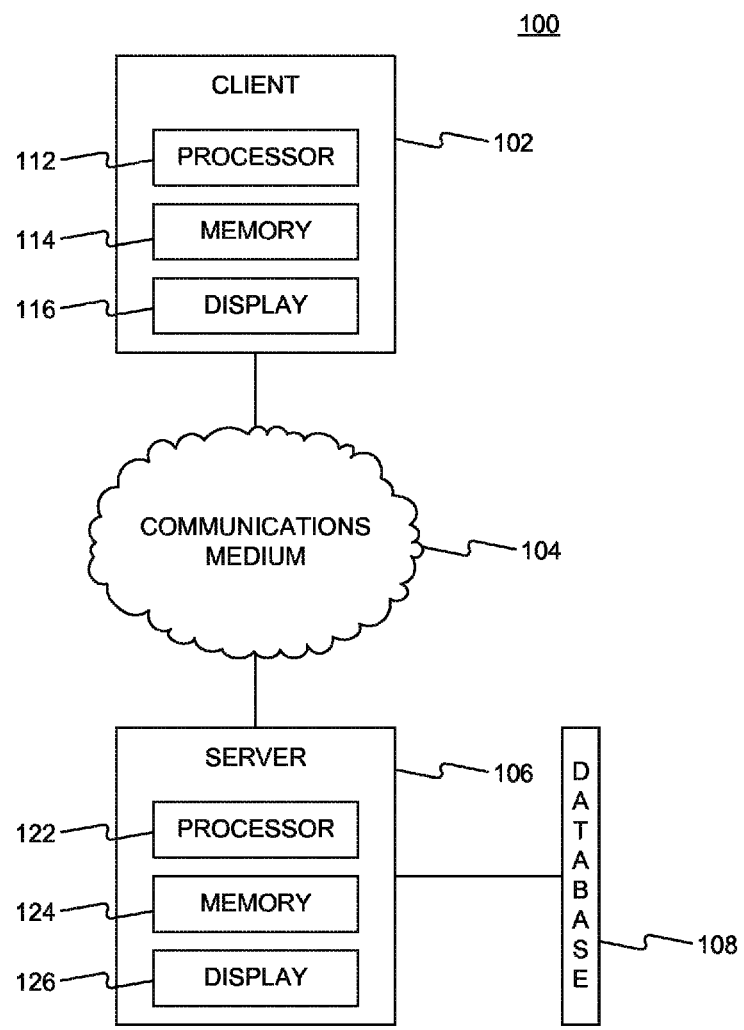
FIG. 1 shows an exemplary electronic communications system for implementing embodiments of the present disclosure.

FIG. 1 shows a block diagram of an exemplary electronic communications system 100 for implementing embodiments and features of the present disclosure. The arrangement and number of components in system 100 is provided for purposes of illustration. Additional arrangements, number of components, and other modifications may be made, consistent with the present disclosure.

As shown in FIG. 1, system 100 may include one or more clients 102. By way of example, clients 102 may include smartphones, tablets, netbooks, electronic readers, personal digital assistants, personal computers, laptops, pagers, and/or other types of electronic communication devices. Client 102 may be implemented with devices, and/or applications running thereon. Client 102 may be configured to communicate to and/or through communications medium 104.

In certain embodiments, communications medium 104 may include any combination of communications networks. For example, communications medium 104 may include the Internet and/or another type of wide area network, an intranet, a metropolitan area network, a local area network, a wireless network, a cellular communications network, etc. In some embodiments, client 102 may be configured to transmit queries through communications medium 104 to an appropriate server, such as, for example, server 106. In some embodiments, client 102 may also be configured to receive search results, in response to the queries, from server 106 through communications medium 104.

Client 102 may include a number of components, such as one or more processor(s) 112 for performing operations related to the present disclosure and memory device(s) 114 and other storage devices (not shown) for storing instructions executed by processor(s) 112 and/or storing electronic communications and other data. Examples of memory devices and other storage devices include hard drives, NOR or NAND flash memory devices, Read Only Memory (ROM) devices, etc. Client 102 may also include a display device 116 for displaying a variety of data and information to a user of client 102. In addition, client 102 may be equipped with input devices (not shown). By way of example, these input devices may include physical keyboards, virtual touch-screen keyboards, mice, joysticks, styluses, etc. In certain embodiments, client 102 may also be capable of receiving input through a microphone (not shown) using voice recognition applications.

Server 106 may include one or more servers configured to interact with the communications medium 104 and a content database 108. In some embodiments, server 106 may implement or provide one or more search engines. Like client 102, server 106 may include a number of components, such as one or more processor(s) 122 for performing operations related to the present disclosure, memory device(s) 124 and other storage devices (not shown) for storing instructions executed by processor(s) 122 and/or storing for electronic communications and other data. Examples of memory devices and other storage devices include hard drives, NOR, NAND, ROM devices, etc. Server 106 may also include a display device 126 for displaying data and information. Server 106 may be equipped with input devices (not shown) similar to those describe above with respect to client 102. In addition, consistent with some embodiments, server 106 may be implemented as a server, a server system comprising a plurality of servers, or a server farm comprising a load balancing system and a plurality of servers.

The content database 108 may include one or more logically and/or physically separate databases configured to store data. The data stored in the content database 108 may be received from servers 106, directly from clients 102, and/or may be provided or provided as input using conventional methods (e.g., data entry, data transfer, data uploading, etc.). The data stored in the content database 108 may take or represent various forms including, but not limited to, documents, presentations, textual content, mapping and geographic information, rating and review information, pricing information, news, audio files, video files, and a variety of other electronic data, or any combination thereof.

In some embodiments, content database 108 may be implemented using a single computer-readable storage medium. In other embodiments, content database 108 may be maintained in a network attached storage device, in a storage area network, or combinations thereof, etc. Furthermore, content database 108 may be maintained and queried using numerous types of database software and programming languages, such as SQL, MySQL, IBM DB2®, Microsoft Access®, PERL, C/C++, Java®, etc.

Although the above description describes clients 102 and servers 106 separately, clients 102 may perform the role of servers 106 and vice-versa. Additionally, clients 102 may have the same hardware components as servers 106. Furthermore, the embodiments of this disclosure may also be implemented on the same device serving, for example, both as a client 102 and a server 106.

Figure 2:
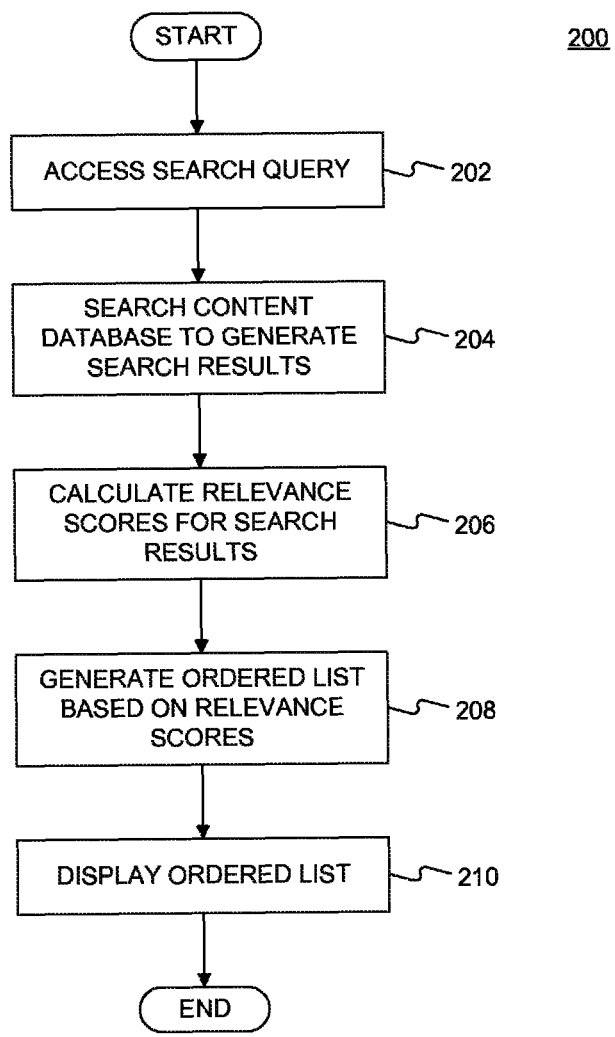
FIG. 2 shows an exemplary method of providing an ordered list of search results, consistent with an embodiment of the present disclosure.

FIG. 2 shows a flowchart of an exemplary process 200, consistent with an embodiment of the present disclosure. As further described below, the exemplary method 200 of FIG. 2 may be implemented for providing an ordered list of search results obtained in response to a query.

As shown in FIG. 2, process 200 may include a step 202 of accessing a query. A query as used in this specification may include a search request in the form of a string of one or more query terms that a user may enter into client 102 or server 106 to search for desired content items. In some embodiments, the search terms provided by the user may be stored in memory 114 or 124, or another type of storage device associated with client 102 or server 106, respectively. In other embodiments, the search terms input by the user, or the stored search terms, may be transformed by client 102 or server 106 to a query, which may take the form of a universal resource locator (URL), which may contain additional information regarding the search to be performed.

FIG. 3 illustrates an exemplary URL including search terms provided by a user, consistent with an embodiment of the present disclosure. For example, the URL in FIG. 3 includes the user's location represented by a latitude of 39.7500300 and longitude of −104.997200. The URL also includes the user's search term "restaurant" indicating that the user wishes to find restaurants near his or her location. In addition, the URL includes terms, such as "restaurantPrice=lowprice" indicating that the user wants to find low price restaurants. Further, the URL specifies that the search may be carried out using the search engine "www.searchengine.com."

Returning to FIG. 2, process 200 may also include a step 204 of searching the content database to generate search results containing content items, which correspond to the query accessed in step 202. The search may be conducted by comparing the query to metadata associated with content items in the content database or by comparing the query with the content items themselves. Alternatively the search may be conducted by comparing the query to a search index. A variety of search techniques, known in the art, may be used to identify a list of content items, which correspond to the query. By way of example, search techniques based on a smallest vector distance or cosine distance between the query and metadata may be used to identify content items corresponding to the query.

Process 200 may also include a step 206 of generating a relevance score for each content item included in the list of search results generated in step 204. The relevance score for a content item may indicate the degree of relevance of that content item to the information requested by the user. In some embodiments, content items having a higher relevance score may be deemed more relevant to the information requested by the user. In other embodiments, content items having a lower relevance score may be deemed more relevant to the information requested by the user. The relevance score may be computed in a variety of ways. In some embodiments, the relevance score may be computed by generating a weighted sum of individual scores assigned to key characteristics desired by the user. Computation of a relevance score using such a weighted sum may be best illustrated by an example, which is further described below.

Consider, for example, the search for a restaurant near a user's location, as illustrated by the query of FIG. 3. Search results obtained in response to this query may include a list of restaurants located at varying distances from the user's location. Further, these restaurants may also have different price points. A first score may be assigned to a restaurant based on its distance from the user's location. Restaurants nearer to the user's location may have a higher value of the first score compared to restaurants, which may be more distant. A second score may be assigned to that restaurant based on its price level. A restaurant which may be less expensive may have a higher second score compared to a more expensive restaurant. A relevance score for each restaurant in the search results may be computed as a weighted sum of the first and second scores. The weights given to the first and scores may be the same or different. Although a weighted sum approach has been described, the relevance scores for the content items in the search results may be estimated using other scoring techniques known in the art.

Consistent with embodiments of the present disclosure, a search engine (e.g., server 106 in FIG. 1) used to search for content items corresponding to a query may determine the order in which content items included in the search results may be presented to the user. For example, the search engine may be configured to preferentially display results having a particular characteristic. In some embodiments, the search engine may do this by boosting the relevance score of content items having that particular characteristic using a boost value. Boost values, consistent with the present disclosure, may comprise numeric values, which may be used to modify a relevance score of a content item.

A relevance score may be modified in a variety of ways by using a boost value. For example, in some embodiments, the relevance score may be modified by multiplying or dividing the relevance score calculated in step 206 by the boost value. In other embodiments, the relevance score may be modified by adding or subtracting the boost value from the relevance score calculated in step 206. In yet other embodiments, the boost value may be used as a threshold relevance score and only content items in the search results with relevance scores greater than the threshold relevance score may be displayed to the user. In other embodiments, the threshold relevance score itself may be scaled up or down using the boost value. Although specific arithmetic operations, for example, multiplying, dividing, adding, subtracting, etc., have been described with regard to modifying the relevance score using the boost value, the boost value may be used in combination with other mathematical functions or operations to modify the relevance score. Boosting of relevance scores based on a particular characteristic may be best described in terms of an example.

To illustrate the use of boost values, consistent with the present disclosure, consider an example involving the search for a restaurant near a user's location, as illustrated by the query of FIG. 3. The search engine "www.searchengine.com" may be configured to give preference to national chain restaurants. The search engine may boost the relevance scores of restaurants belonging to a national chain by multiplying the relevance scores of those restaurants by a boost value (e.g., 1.5). The relevance scores of other locally owned restaurants may not be modified. Thus, the search engine may preferentially provide information regarding national chain restaurants to a user by increasing the relevance score of national chain restaurants and by presenting content items having a relatively higher relevance score before presenting content items having a relatively lower relevance score.

Although only one boost parameter has been discussed in the above disclosure, there may be more than one boost parameter. For example, the search engine may be configured to scale down the relevance scores of restaurants which do not provide pricing information on their web sites for food items on their menu. Thus, for example, the search engine may scale up the relevance scores of national chain restaurants by multiplying the relevance scores by a boost value of 1.5 and at the same time scale down the relevance scores of restaurants that do not provide pricing information for food items by multiplying their relevance scores by a different boost value, for example, 0.75. In certain embodiments, the boost values used to modify the relevance scores may be provided as default boost values, which may be stored in memory 114 or 124 of client 102 or server 106, respectively, and accessed when the search engine is activated to perform a search.

As further illustrated in FIG. 2, process 200 may include a step 208 of generating an ordered list of search results based on the relevance scores. The ordered list may be generated by arranging the content items in the search results based on the relevance scores. In some embodiments, content items having higher relevance scores may be listed first, closer to a top of the ordered list, while content items having a lower relevance score may be listed further down, nearer a bottom of the ordered list. In other embodiments, content items having lower relevance scores may be listed nearer the top of the ordered list and content items having larger relevance scores may be listed nearer the bottom of the list. Consistent with the present disclosure, the use of one or more boost values to modify the relevance scores will affect the position of the content items on the ordered list.

In some embodiments, the ordered list may be limited to content items having a relevance score exceeding a threshold relevance score. For example, expensive restaurants, having little or no rating information, and located far away from the user's location may have a very small relevance score. The threshold relevance score may be used to limit the number of search results that may be presented to the user. For example, with regard to the exemplary query of FIG. 3, only those restaurants with relevance scores exceeding the threshold relevance score may be included in the ordered list. By minimizing the number of content items presented to the user, it may be possible to provide the user with the most relevant information. As further illustrated in FIG. 2, process 200 may also include a step 210 of displaying the ordered list on a display 116 or 126 of a client 102 or a server 106, respectively.

Figure 4:
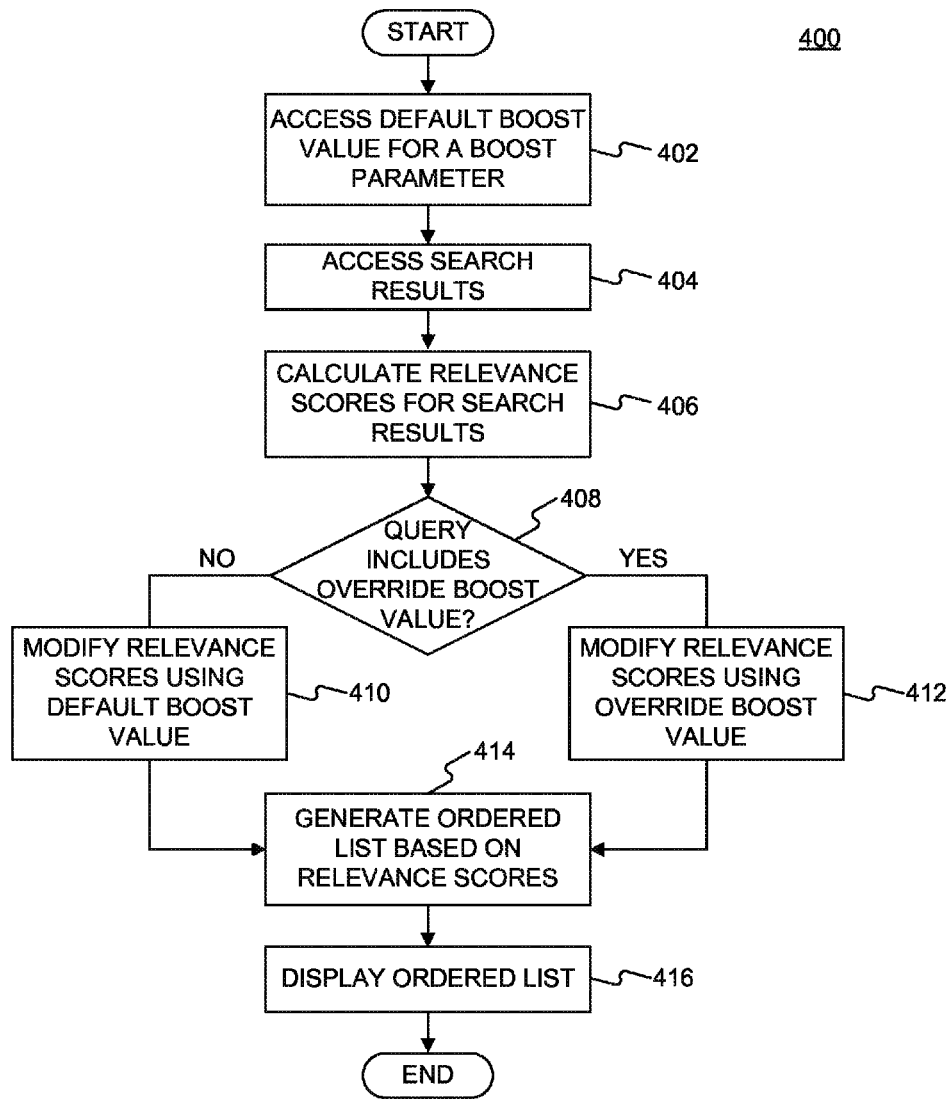
FIG. 4 shows an exemplary method of providing an ordered list of search results based on boost values supplied with a query, consistent with embodiments of the present disclosure.

FIG. 4 shows a flowchart of an exemplary process 400, consistent with an embodiment of the present disclosure. As further described below, the exemplary method of FIG. 4 may be implemented for providing an ordered list of search results customized by using boost values provided with a query.

As shown in FIG. 4, process 400 may include a step 402 of accessing one or more default boost values. Accessing a default boost value may involve client 102 or server 106 receiving the default boost value through communications medium 104. For example, client 102 may receive a default boost value from a server 106 via communications medium 104. In some embodiments, accessing the default boost value may involve reading the default boost value from memory 114 or 124, or another type of storage device associated with client 102 or server 106, respectively. Although, a single default boost value and a single boost parameter have been described here, there may be numerous boost parameters, each having its own default boost value, which may be accessed in a similar manner.

Process 400 may also include a step 404 of accessing search results. Accessing search results may involve client 102 or server 106 receiving the search results through communications medium 104. For example, client 102 may receive the search results from server 106 via communications medium 104 or vice-versa. In some embodiments, accessing the search results may involve executing process 200 on client 102 or server 106 to generate the search results. In some embodiments, client 102 or server 106 may execute process 200 and store the search results in memory 114 and 124, or another type of storage device associated with client 102 and server 106, respectively. The stored search results may be accessed by client 102 or server 106 during step 404.

In addition, process 400 may include a step 406 of generating relevance scores for each content item in the search results. In some embodiments, client 102 or server 106 may execute a process similar to that of process step 206 of process 200 described above. In some embodiments, after executing the process step 206, client 102 or server 106 may save the relevance scores in memory 114 or 124, or another type of storage device associated with client 102 and server 106, respectively, and the stored relevance scores may be accessed by client 102 or server 106 during step 406.

As further shown in FIG. 4, process 400 may include a step 408 of determining whether the query includes any boost values. By way of example, FIG. 5 illustrates a query in the form of a URL, which includes a boost value of 2.0 for a boost parameter called "ratingsBoost." A boost value supplied with a query may be used as an override boost value because it "overrides" or replaces the default boost value for a particular boost parameter.

Returning to FIG. 4, in step 408, if it is determined that the query does not include any boost values (step 408, NO; see, e.g., the URL in FIG. 3, which does not include an override boost value), process 400 may proceed to step 410. In step 410, the relevance score of each content item included in the search results may be modified using the default boost values accessed during step 402. Thus, for example, if the default boost value for boost parameter "ratingsBoost" was 1.25, the relevance scores calculated during step 406 may be modified using the default value of 1.25.

By way of example, in a search for restaurants closest to the location of the user (see FIG. 3), the content item identifying a restaurant having the smallest distance from the user's location may have the highest relevance score. Content items representing restaurants which lie further from the user's location may correspondingly have a lower relevance score. The relevance score of all restaurants, which have been assigned ratings by other patrons, may be scaled up by multiplying their relevance scores using the default boost value of 1.25 for the "ratingsBoost" parameter. The modified relevance scores may then be used for further processing using process 400.

As further illustrated in FIG. 4, if in step 408 it is determined that the query includes a boost value for a particular boost parameter (step 408:Yes; see, e.g., the URL in FIG. 5, which includes an override boost value for the "ratingsBoost" parameter), process 400 may proceed to step 412. In step 412, the relevance score of each content item in the search results may be modified using the override boost value specified in the query, thereby overriding the default boost value for that parameter. Thus, for example, because a boost value of 2.0 for the "ratingsBoost" parameter was included in the query in FIG. 5, the relevance scores of restaurants, which have received ratings from other patrons may be scaled up by multiplying the relevance scores by the specified boost value of 2.0 instead of by the default boost value of 1.25. Multiplying the relevance scores by the override boost value of 2.0 will help to differentiate rated restaurants from non-rated restaurants to a larger degree than by using the default boost value of 1.25. Thus, an application developer of a restaurant finder application may be able to present customized results, which better differentiate restaurant's having a rating, by including an override boost value for the "ratingsBoost" parameter in the query.

Although only one boost parameter has been discussed in the above exemplary embodiments, more than one boost parameter may be provided in a query. Furthermore, an applications developer may choose to use some or all of the boost parameters provided in a query to boost the relevance score of content items included in the search results. In addition, in some embodiments, when a query includes an override boost value, either the default boost value or the override boost value of a boost parameter may be used modify the relevance scores.

In some embodiments, an application developer may expose one or more boost parameters to a user of client 102. For example, in a restaurant finder application, the user may be able to alter certain settings in the application to specify a preference for restaurants which have received ratings from other patrons. In this case, the restaurant finder application may add the name of the boost parameter (e.g. "ratingsBoost") and the override boost value (e.g., 2.0) to the query used to generate the search results. If the user changes the settings to eliminate this requirement, the restaurant finder application may not provide a value of the "ratingsBoost" parameter in the query. In other embodiments, the application developer may permit a user to enter names or titles associated with one or more boost parameters and/or their override boost values together with the search terms.

As shown in FIG. 4, process 400 may also include a step 414 of generating an ordered list of search results based on the relevance scores, which have been modified either by one or more default boost values or override boost values. The process of step 414 may be similar to that described earlier for step 208 of process 200. Process 400 may also include a step 416 of displaying the ordered list on a display 116 or 126 of client 102 or server 106, respectively.

In some embodiments, processes 200 and/or 400 may be carried out entirely on client 102. In other embodiments, processes 200 and/or 400 may be carried out entirely on server 106. In yet other embodiments, some steps of processes 200 and/or 400 may be performed on a client 102 and other steps of processes 200 and/or 400 may be performed on a server 106.

For example, a user may input a query using any of the input devices associated with a client 102. The query may include the names of one or more boost parameters and the override boost values for each of the named boost parameters. Client 102 may transmit the query, including the names and values of the boost parameters, via communications medium 104 to server 106. Server 106 may perform a search of content database 108 using the query, generating search results containing content items corresponding to the query. Server 106 may determine the relevance scores for each of the content items in the search results. In addition, server 106 may modify the relevance scores based on one of either the default boost values or the override boost values supplied by the query. In some embodiments, server 106 may modify the relevance scores using default boost values, when the query does not include any boost values. In other embodiments, server 106 may modify the relevance scores using override boost values, when the query includes override boost values. Server 106 may generate an ordered list of the content items based on the modified relevance scores. Server 106 may also transmit the ordered list to client 102 via communications medium 104. Client 102 may receive the ordered list from server 106 via communications medium 104 and display the ordered list on display 116 for the user. Although this example discloses a scenario where client 102 provides the query and server 106 performs the search and other processes, the processes described above with regard to server 106 may be performed by client 102 and vice-versa.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A method, comprising:
    receiving, using at least one processor, a query including at least one search term;
    searching, using the at least one processor, a content database to identify content items related to the at least one search term;
    accessing, using the at least one processor, a default boost value from a memory device;
    determining, using the at least one processor, whether the query includes a first override boost value;
    selecting, using the at least one processor, a boost value as one of:
        the default boost value when the query is determined to not include the first override boost value, or
        the first override boost value when the query is determined to include the first override boost value;
    accessing, using the at least one processor, a second override boost value from the query;
    generating, using the at least one processor, a first relevance score for each content item of the identified content items by combining a plurality of scores assigned to characteristics that apply to the identified content item;
    selecting, using the at least one processor, at least one content item that includes a characteristic associated with the boost value from the identified content items;
    generating, using the at least one processor, a second relevance score for the selected at least one content item by modifying the first relevance score of the at least one content item using the boost value and the second override boost value;
    generating, using the at least one processor, an ordered list of the identified content items based on the first and second relevance scores; and
    causing, using the at least one processor, the ordered list to be displayed on a display device.

2. The method of claim 1, wherein generating the second relevance score includes multiplying the first relevance score using the boost value.

3. The method of claim 1, wherein generating the second relevance score includes adding the boost value to the first relevance score.

4. The method of claim 1, wherein generating the second relevance score includes replacing a threshold relevance score with the boost value.

5. The method of claim 1, wherein generating the second relevance score includes scaling a threshold relevance score with the boost value.

6. The method of claim 1, wherein generating the ordered list includes listing the content items having relatively higher relevance scores nearer a top of the ordered list.

7. The method of claim 6, wherein the ordered list includes only the content items having second relevance scores greater than a threshold relevance score.

8. A system, comprising:
a memory that stores a set of instructions; and
at least one processor that executes the set of instructions to:
  receive a query including at least one search term;
  access a default boost value from a memory device;
  search a content database to identify content items related to the at least one search term;
  determine whether the query includes a first override boost value;
  select a boost value as one of:
    the default boost value when the query is determined to not include the first override boost value, or
    the first override boost value when the query is determined to include the first override boost value;
  access a second override boost value from the query;
  generate a first relevance score for each content item of the identified content items by combining a plurality of scores assigned characteristics that apply to the identified content items;
  select at least one content item that includes a characteristic associated with the boost value from the identified content items;
  generate a second relevance score for the selected at least one content item by modifying the first relevance score of the at least one content item using the boost value and the second override boost value;
  generate an ordered list of the identified content items based on the first and second relevance scores; and
  transmit the ordered list to a display device.

9. The system of claim 8, wherein the at least one processor, when generating the second relevance score, is to:
  multiply the first relevance score using the boost value.

10. The system of claim 9, wherein the at least one processor, when generating the second relevance score, is to:
  scale a threshold relevance score with the boost value.

11. A non-transitory computer-readable medium storing instructions, the instructions comprising:
  one or more instructions, which when executed by at least one processor, cause the at least one processor to:
    receive a query including at least one search term;
    search a content database to identify content items related to the at least one search term;
    access a default boost value from a memory device;
    determine whether the query includes a first override boost value;
    select a boost value as one of:
      the default boost value when the query is determined to not include the first override boost value, or
      the first override boost value when the query is determined to include the first override boost value;
    access a second override boost value from the query;
    generate a first relevance score for each content item of the identified content items by combining a plurality of scores assigned to characteristics that apply to the identified content item;
    select at least one content item that includes a characteristic associated with the boost value from the identified content items;
    generate a second relevance score for the selected at least one content item by modifying the first relevance score of the at least one content item using the boost value and the second override boost value;
    generate an ordered list of the identified content items based on the first and second relevance scores; and
    displaying cause the ordered list to be displayed on a display device.

12. The computer-readable medium of claim 11, wherein the one or more instructions, which cause the at least one processor to generate the second relevance score, cause the at least one processor to:
  multiply the first relevance score using the boost value.

13. The computer-readable medium of claim 11, wherein the one or more instructions, which cause the at least one processor to generate the second relevance score, cause the at least one processor to:
  add the boost value to the first relevance score.

14. The system of claim 8, where the at least one processor, when generating the second relevance score, is to:
  replace a threshold relevance score with the boost value.

15. The system of claim 8, where the at least one processor, when generating the ordered list, is to:
  list the content items having relatively higher relevance scores nearer a top of the ordered list.

16. The system of claim 8, where the at least one processor, when generating the ordered list, is to:
  list only the content items having second relevance scores greater than a threshold relevance score.

17. The system of claim 8, where the at least one processor, when generating the second relevance score, is to:
  add the boost value to the first relevance score.

18. The computer readable medium of claim 11, where the one or more instructions, which cause the at least one processor to generate the ordered list, cause the at least one processor to:
  list only content items having second relevance scores greater than a threshold relevance score.

19. The computer readable medium of claim 11, where the one or more instructions, which cause the at least one processor to generate the ordered list, cause the at least one processor to:
  list the content items having relatively higher relevance scores nearer a top of the ordered list.

20. The computer readable medium of claim 11, wherein one or more instructions, which cause the at least one processor to generate the second relevance score, cause the at least one processor to:
  replace a threshold relevance score with the boost value.

21. The computer readable medium of claim 11, wherein one or more instructions, which cause the at least one processor to generate the second relevance score, cause the at least one processor to:
  scale a threshold relevance score with the boost value.

* * * * *